(12) United States Patent
Foster

(10) Patent No.: US 7,521,009 B2
(45) Date of Patent: Apr. 21, 2009

(54) METHOD OF MANUFACTURING A THERMALLY CONDUCTIVE DRIVE BELT

(75) Inventor: Jon S. Foster, Cranston, RI (US)

(73) Assignee: Cool Options, Inc., Warwick, RI (US)

( * ) Notice: Subject to any disclaimer, the term of this patent is extended or adjusted under 35 U.S.C. 154(b) by 590 days.

(21) Appl. No.: 10/864,956

(22) Filed: Jun. 10, 2004

(65) Prior Publication Data

US 2004/0222546 A1  Nov. 11, 2004

Related U.S. Application Data

(62) Division of application No. 10/337,538, filed on Jan. 7, 2003, now Pat. No. 6,919,115.

(60) Provisional application No. 60/346,514, filed on Jan. 8, 2002.

(51) Int. Cl.
B29C 45/00 (2006.01)
B29C 45/14 (2006.01)

(52) U.S. Cl. ............. 264/104; 264/105; 264/279.1; 264/328.18

(58) Field of Classification Search ............. 264/104, 264/105, 279.1, 328.18
See application file for complete search history.

(56) References Cited

U.S. PATENT DOCUMENTS

| | | | |
|---|---|---|---|
| 3,667,308 A | 6/1972 | Schwab et al. ............. 474/263 |
| 4,299,588 A | 11/1981 | Standley ............. 474/264 |
| 4,493,681 A | 1/1985 | Takano ............. 474/265 |
| 4,545,926 A | 10/1985 | Fouts, Jr. et al. ............. 252/511 |
| 4,734,087 A | 3/1988 | Takano ............. 474/270 |
| 4,767,389 A | 8/1988 | Habegger et al. ............. 474/266 |
| 4,900,877 A | 2/1990 | Dubrow et al. ............. 174/35 GC |
| 4,938,279 A | 7/1990 | Betker ............. 165/46 |
| 4,948,922 A | 8/1990 | Varadan et al. ............. 174/35 GC |
| 4,999,741 A | 3/1991 | Tyler ............. 361/387 |
| 5,061,566 A | 10/1991 | Morgan ............. 428/423.1 |
| 5,068,493 A | 11/1991 | Benn, Sr. et al. ............. 174/35 GC |
| 5,115,104 A | 5/1992 | Bunyan ............. 174/35 GC |
| 5,187,225 A | 2/1993 | Kitagawa ............. 524/847 |
| 5,315,480 A | 5/1994 | Samarov et al. ............. 361/705 |
| 5,430,609 A | 7/1995 | Kikinis ............. 361/687 |
| 5,440,172 A | 8/1995 | Sutrina ............. 257/712 |
| 5,513,070 A | 4/1996 | Xie et al. ............. 361/700 |
| 5,552,960 A | 9/1996 | Nelson et al. ............. 361/687 |
| 5,557,500 A | 9/1996 | Baucom et al. ............. 361/687 |

(Continued)

*Primary Examiner*—Leo B Tentoni
(74) *Attorney, Agent, or Firm*—S Barlow, Josephs & Holmes, Ltd.

(57) ABSTRACT

The present invention provides a novel method whereby a thermally conductive belt is manufactured through net shape molding. Specifically the method of the present invention is for manufacturing a power transfer belt that is of a highly thermally conductive polymer composition, in contrast to the typical rubber material used to fabricate the belts of the prior art. The new and unique belt of the present invention is manufactured of a thermally conductive polymer material that is easily injection moldable into any desired shape and configuration. Further, the polymer composition is very thermally conductive, which assists in dissipating heat that is generated by the friction created during normal operation of the device. The new belt material and its construction allow heat to be conducted directly through the surface of the belt thus preventing heat buildup within the belt itself, thereby preserving and extending its life.

6 Claims, 5 Drawing Sheets

U.S. PATENT DOCUMENTS

| | | | |
|---|---|---|---|
| 5,572,070 A | 11/1996 | Ross | 257/13 |
| 5,660,917 A | 8/1997 | Fujimori et al. | 428/195 |
| 5,669,941 A | 9/1997 | Peterson | 51/295 |
| 5,738,936 A | 4/1998 | Hanrahan | 428/313.5 |
| 5,781,412 A | 7/1998 | de Sorgo | 361/704 |
| 5,790,376 A | 8/1998 | Moore | 361/700 |
| 5,873,018 A | 2/1999 | Aoto et al. | 399/302 |
| 5,910,524 A | 6/1999 | Kalinoski | 523/215 |
| 6,048,919 A | 4/2000 | McCullough | 524/404 |
| 6,204,303 B1 | 3/2001 | Osuna et al. | 522/71 |
| 6,348,654 B1 | 2/2002 | Zhang et al. | 174/35 GC |
| 6,410,137 B1 | 6/2002 | Bunyan | 428/356 |
| 6,442,365 B1 | 8/2002 | Schlueter et al. | 399/328 |
| 6,468,656 B1 * | 10/2002 | Beha | 428/396 |
| 6,517,744 B1 | 2/2003 | Hara et al. | 252/506 |
| 6,530,854 B2 | 3/2003 | Sakuma et al. | 474/237 |
| 6,659,898 B2 | 12/2003 | Morikoshi et al. | 474/237 |
| 6,846,436 B1 * | 1/2005 | Kitamura et al. | 252/511 |
| 2002/0090501 A1 | 7/2002 | Tobita | 428/297.4 |

* cited by examiner

METHOD OF MANUFACTURING A THERMALLY CONDUCTIVE DRIVE BELT

CROSS-REFERENCE TO RELATED APPLICATIONS

This application is a divisional application of earlier filed patent application Ser. No. 10/337,538, filed Jan. 7, 2003, now U.S. Pat. No. 6,919,115, and is related to and claims priority from earlier filed provisional patent application No. 60/346,514, filed Jan. 8, 2002.

BACKGROUND OF THE INVENTION

The instant invention relates generally to improved thermally conductive drive belts for motor applications and a method of manufacturing the same. More specifically, the present invention relates to the manufacture of automotive belts, such as power transfer or drive train belts, using thermally conductive polymer compositions to overcome the traditional problems typically associated with surface heat caused by friction. While well suited for automotive applications, the belt of the present invention is also applicable for use as a drive belt in any environment where such a device is required.

In automotive applications, belts are commonly used to provide power to a variety of accessories mounted adjacent to the automobile engine. In these applications, drive belts are routed around a series of pulley wheels to transfer power from the crankshaft of the engine in order to provide power to accessories such as fans, alternators, air-conditioning compressors and other automobile components. In this arrangement, the belt makes frictional contact with the face of pulleys mounted on each of the components. The use of this type of belt and pulley system to accomplish the transfer of power to the several operation components of a motor has been proven to have certain deficiencies mainly due to the fact that the pulleys rely upon friction to provide transfer of energy from the drive belt for their motive force. In operation, the belt rotates at a high speed causing the pulleys that it comes into contact with to rotate as a result of the frictional force exerted by the surface of the belt on the surface of the pulleys. It can be seen that during their normal operational cycle these belts are exposed to a great deal of frictional force and in turn high levels of heat. This exposure to friction and heat during normal operation of these systems is often the primary reason why belts, including automotive power-train belts, quickly wear out and ultimately fail. Alternately, the build-up of heat may cause the rubber to harden thereby reducing the frictional forces between the belt and pulley causing the belt to slip, in turn further polishing the contact surface of the belt. If the frictional force is lost between the pulley and the belt, additional slippage will occur, causing either an objectionable squealing noise that will be audible to the driver as the belt slips or a change in speed of the driven accessory.

Currently, conventional multi-ribbed belts and pulleys are used on several drive systems with automobile engines. The increased surface area of the ribs enhances the overall frictional forces between the belts and the pulleys, however, as a result of the increased friction, additional heat is generated. U.S. Pat. No. 4,905,361 describes a conventional multi-ribbed pulley, designed to work with a multi-ribbed belt that includes the addition of lateral grooves that extend in an axial direction over a surface of the pulley and a roughened surface to form a higher frictional interface. Clearly, this configuration would generate even more heat due to the greatly increased frictional relationship.

Therefore, there is a desire for power-train drive belts, such as those used in automobiles, boats and other stationary engines like those used in generators, that are less prone to wear and failure due to heat and friction that they experience during use. In this regard, it is highly desirable to provide a belt that is capable of dissipating the heat generated during the normal operational cycle of the belt without the need for including separate fans and other cooling mechanisms.

BRIEF SUMMARY OF THE INVENTION

In this regard, the present invention provides for belts that are manufactured of a material that is highly thermally conductive in contrast to the typical rubber material used to fabricate the belts of the prior art. The new and unique engine belt of the present invention is manufactured of a thermally conductive polymer material. Manufacturing a belt as provided in the disclosure of the present invention, using a thermally conductive polymer material, provides two distinct advantages over the prior art. First, the composition used in the manufacture of the belt of the present invention is easily injection moldable into any desired shape and configuration. The appropriate ribbing, for communication with pulleys and the like, is easily molded into the surface profile of the belt. By manufacturing the belt in this manner, it is designed to be easily interchangeable as a replacement for the traditional rubber or reinforced rubber belts of the prior art. Further, this polymer composition is highly thermally conductive, which assists in dissipating heat that is generated by the friction created as described above. The new belt material and its construction allow heat to be conducted directly through the surface of the belt thus preventing heat buildup within the belt itself, thereby preserving and extending their life.

The method of the present invention also provides a novel and unique method of manufacturing a drive belt from a thermally conductive polymer composition. The method provides for net-shape injection molding the belt from a polymer base matrix loaded with a thermally conductive filler. Upon removal from the mold, the belt is in its completed form, ready for use, thereby eliminating any further processing steps such as trimming, milling or cutting.

Accordingly, one of the objects of the present invention is the provision of a thermally conductive drive belt for power transfer applications. Another object of the present invention is the provision of a thermally conductive drive belt that is fabricated from a polymer composition loaded with a thermally conductive filler to enhance the longevity of the belt. Yet another object of the present invention is the provision of a net shape molded thermally conductive drive belt that is manufactured from a polymer composition that has enhanced thermal conductivity properties as compared to the prior art. A further object of the present invention is the provision of a method of manufacturing a thermally conductive drive belt to create a net shape molded finished product thereby eliminating further processing.

Other objects, features and advantages of the invention shall become apparent as the description thereof proceeds when considered in connection with the accompanying illustrative drawings.

BRIEF DESCRIPTION OF THE DRAWINGS

In the drawings which illustrate the best mode presently contemplated for carrying out the present invention.

DETAILED DESCRIPTION OF THE INVENTION

Figure 1:
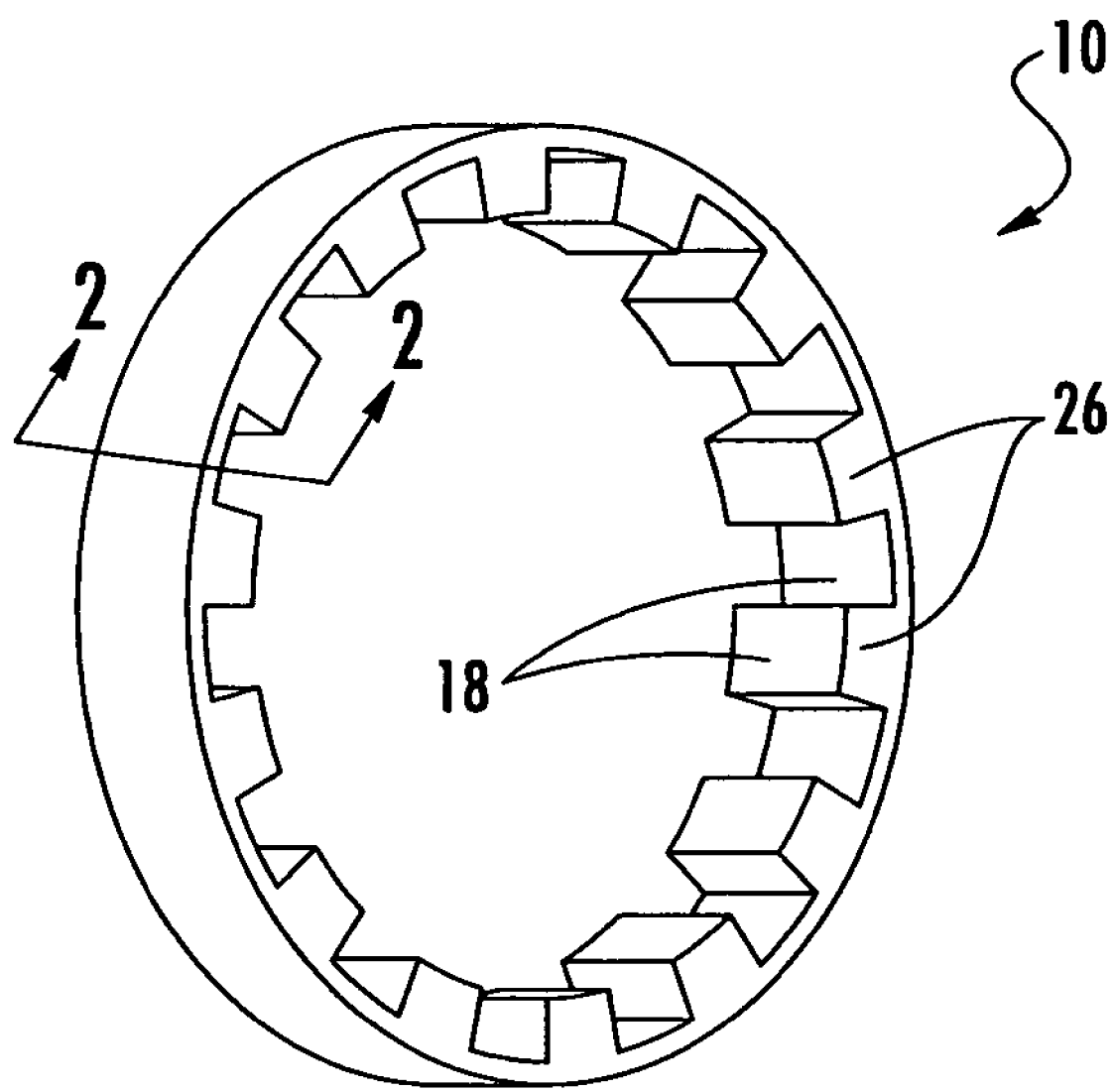
FIG. 1 is a perspective view of the thermally conductive drive belt of the present invention.

Referring now to the drawings, the thermally conductive drive belt of the present invention is illustrated and generally indicated at 10 in FIGS. 1-4. The drive belt 10 is an endless loop power transmission type belt with no seams or joint locations. The belt 10 may be of the synchronous or asynchronous type as will be further discussed in detail below.

Figure 2:
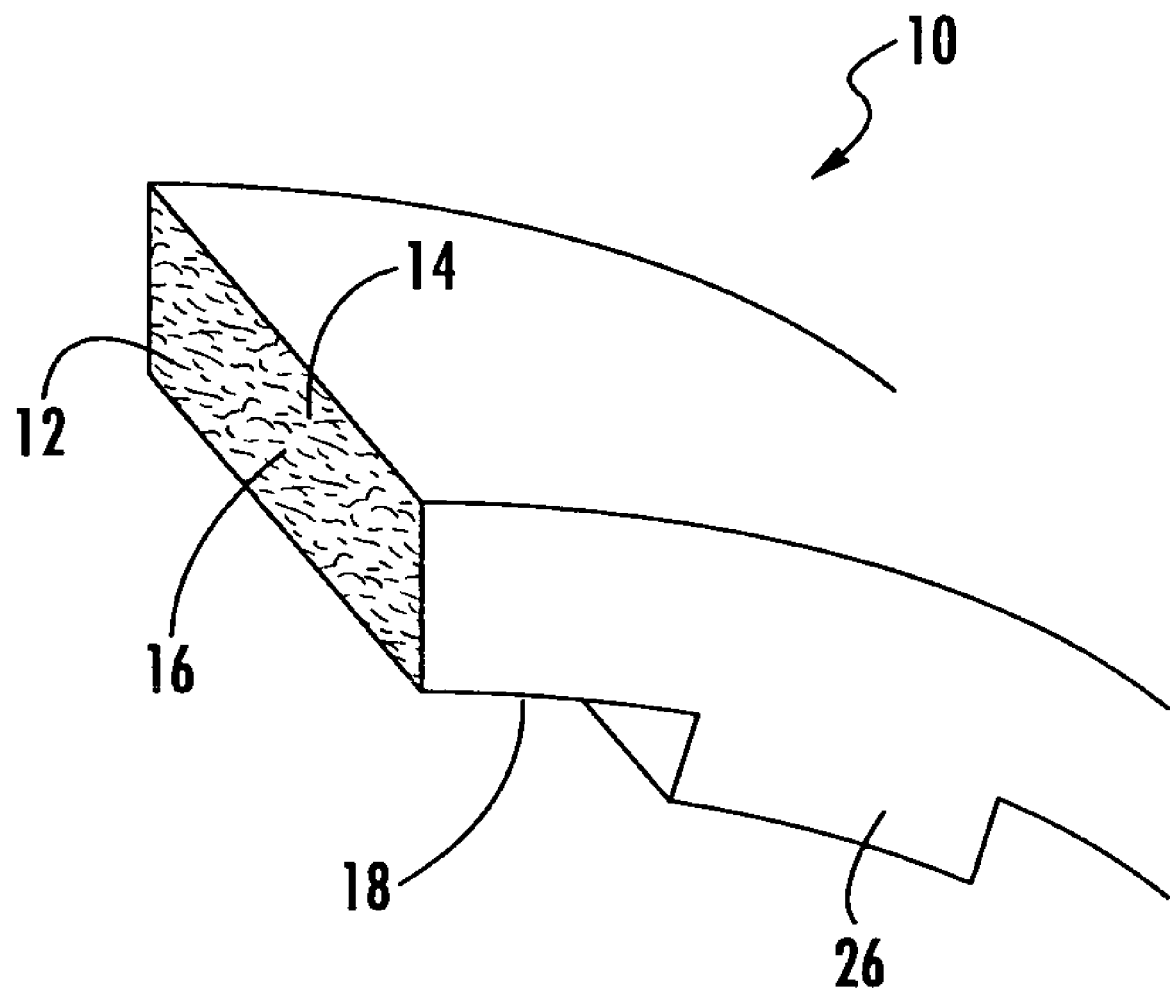
FIG. 2 is a cross-sectional view thereof as taken along line 2-2 of FIG. 1.

As is best illustrated in FIGS. 1 and 2, the belt 10 of the present invention is preferably manufactured of a moldable thermally conductive polymer composition. A base polymer matrix 12 is provided, which is loaded with thermally conducting filler material 14,16 that imparts thermally conductive properties to the net shape moldable material. The base polymer matrix 12 material must exhibit high temperature resistance and a high level of wear tolerance. Further, the base polymer matrix 12 must exhibit dimensional stability both in its longitudinal dimension as well as in its width. This is important to prevent the belt 10 from slipping under load as it is particularly important that the length of the belt 10 not change once the belt 10 is tensioned. In this regard, the preferred material for use as a base polymer matrix 12 is a high temperature flexible thermoplastic composite. The novel use of a high temperature thermally conductive flexible thermoplastic composite provides substantial dimensional stability for the life of the belt 10 and minimizes frictional heat generation. The reduced heat generation is provided in that the composition is thermally conductive, effectively conducting heat away from the contact surfaces of the belt 10 and allowing the heat greater area through which to dissipate. The high temperature flexible thermoplastic 12 allows for the use of the belt 10 in high temperature environments such as an automotive engine compartment, where temperatures frequently range from about 120° C. to about 150° C.

Figure 3:
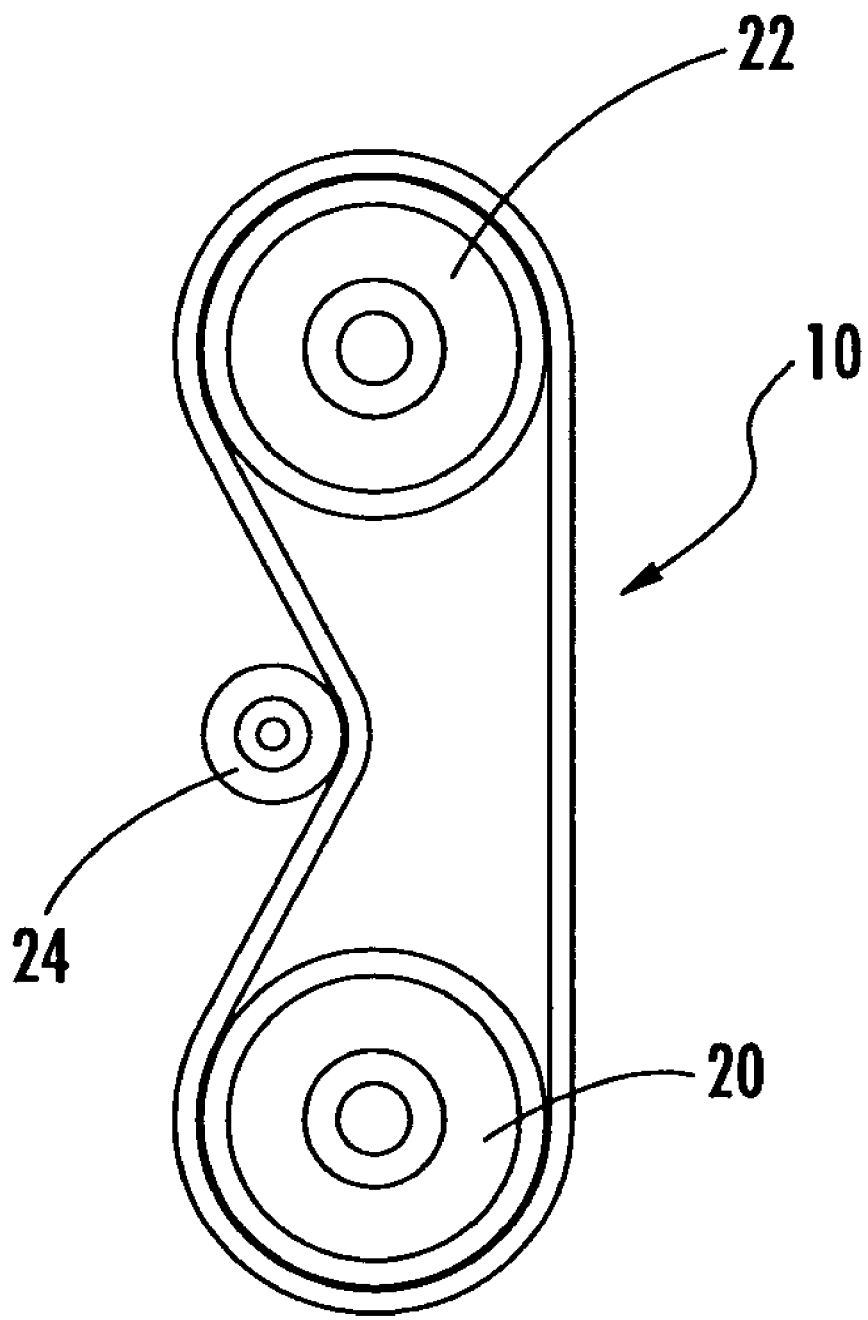
FIG. 3 is a front view of the drive belt of the present invention in a typical power transfer configuration.

High temperature flexible thermoplastics 12 suitable for use as the base matrix material in the present invention must be is wear resistant and sufficiently flexible, or may be modified to be sufficiently flexible, to be driven about the small radius sprockets and/or sheaves commonly encountered in automotive engine compartments. In a typical drive arrangement, as shown in FIG. 3, the drive belt 10 is looped over at least one power sheave 20 and at least one drive sheave 22 and tensioned by an idler sheave 24. The idler sheave 24 serves only to maintain constant tension in the belt 10 and in this configuration rotational energy is transferred by the belt 10 from the power sheave 20 to the drive sheave 24. In this example, it can therefore be seen that flexibility and dimensional stability are important in this type of drive belt 10.

The thermoplastic composite preferably has a thermal conductivity of at least 20 W/m° K or more. However, certain applications may require a lower or much higher thermal conductivity, which can be achieved by adjusting the loading ratios of the previously mentioned filler materials 14,16. Further, it is possible to employ just high aspect ratio filler material 14 or low aspect filler 16 as the sole filler material in the composite 12 and still be within the scope of the present invention.

Turning back to FIG. 2 the base matrix is then loaded with at least one type of thermally conductive filler material 14 to impart thermally conductive properties to the overall composition. While any suitable castable elastomer 12 may be used as the base polymer matrix 12 in the preferred embodiment of the present invention, a high temperature flexible thermoplastic composite 12 useful in the present invention comprises from about 30% to about 60% by volume of a high temperature thermoplastic material 12, and from about 40% to about 70% by volume of a thermally conductive filler material 14. More preferably, thermally conductive composite composition includes a high temperature thermoplastic base matrix 12 of, by volume, between 30% and 60%, a first thermally conductive filler 14, by volume, between 25% and 60% that has a relatively high aspect ratio of at least 10:1 and a second thermally conductive filler 16, by volume, between 10% and 25% that has a relatively low aspect ratio of 5:1 or less.

The high temperature flexible thermoplastic composite 12 useful in the present invention is characterized by a melting point greater than that of polyethylene, i.e., greater than about 115° C., more preferably greater than about 150° C., and most preferably greater than about 175° C. High temperature thermoplastic materials suitable for use as the base matrix component of the composite in the present invention preferably have excellent abrasion or wear resistant properties, and include but are not limited to materials based on polyamides such as nylon 6 and nylon 6,6, and may also include those based on polyolefins and polyesters. For use in the present invention, the high temperature thermoplastic material must also be sufficiently flexible to tolerate dynamic operation around small sprockets and/or sheaves. Flexible polyamide-based materials such as flexible nylon 6 materials and flexible nylon 6,6 materials, as well as flexible polyolefin materials and flexible polyester materials are preferred. The nylon materials are more preferred in this embodiment of the present invention and may be modified in order to be flexible enough to permit belts incorporating this material to be driven around small sheaves under dynamic load conditions.

Once the polymer matrix 12 is heated to a molten state, the thermally conductive filler component 14,16 is loaded into the molten polymer 12. The thermally conductive high aspect ratio filler material 14 that is loaded into the base polymer matrix 12 can be carbon-based filler such as pan based or pitch based carbon fibers, or carbon flakes. Other fillers that are suitable for use as a low aspect ratio filler 16 include boron nitride, metal flakes, alumina and crushed glass. The combination of the high 14 and low 16 aspect ratio fillers allows the different filler types to nest within one another within the final composition thereby enhancing the thermal conductivity of the composition 12 by reducing the size and number of thermal interfaces within the composition 12. The thermally conductive properties of the polymer composition 12 of the present invention are critical to the present invention in order to obtain the desired heat dissipation characteristics provided for in the present disclosure. It is also important to note that the entire belt is of a homogenous construction and material. In particular, the thermally conductive polymer composition 12 is present throughout the entire cross-sectional area of the belt 10 with a uniform distribution of thermally conductive filler 14,16 throughout. In this manner, the entire belt 10 provides thermal conduction and dissipation, quickly removing heat from the contact surface 18 of the belt 10.

Figure 4:
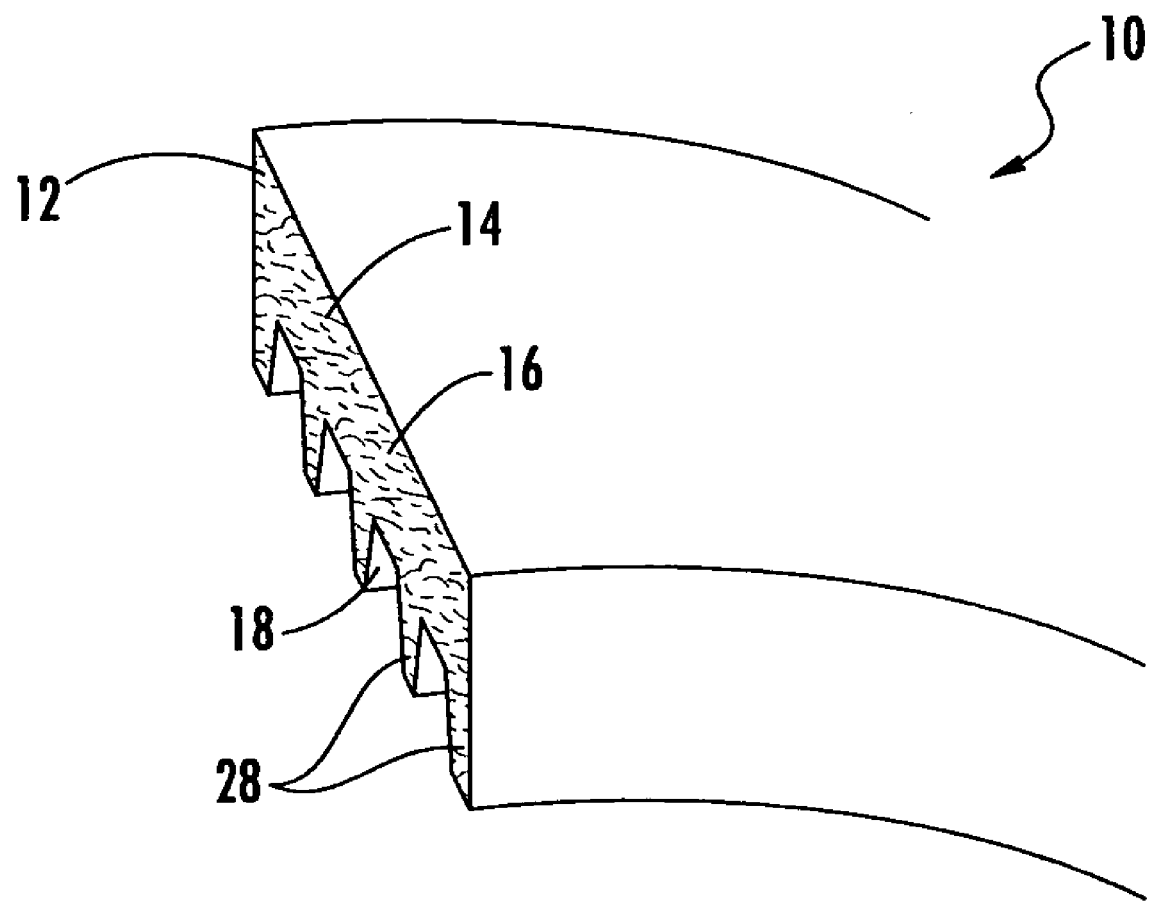
FIG. 4 is a cross-sectional view thereof illustrating an alternate groove pattern.

After the material composition is prepared, by mixing the filler 14,16 into the base matrix 12, it is injection molded into a mold cavity (not shown). The resultant belt 10 is net-shape molded, which means that after the belt 10 is molded, such as by injection molding, further tooling or shaping of the belt 10 is not necessary because it has been molded into its final shape and configuration as actually used. In this manner, it can be seen that any belt 10 profile can be produced such as the synchronous type belt 10 shown FIGS. 1 and 2, with the grooves 26 running laterally across the inner surface of the belt 10. This type belt 10 has grooves 26 that engage mating grooves in each of the sheaves 20,22 maintaining their relative rotational position in alignment or synchronization with one another. Further, an asynchronous belt 10 as shown in FIG. 4, can also be formed using a different mold cavity to produce the traditional longitudinally grooved serpentine profile 28 or a v-belt profile (not shown) without any additional shaping requirements other than the molding step.

Figure 5:
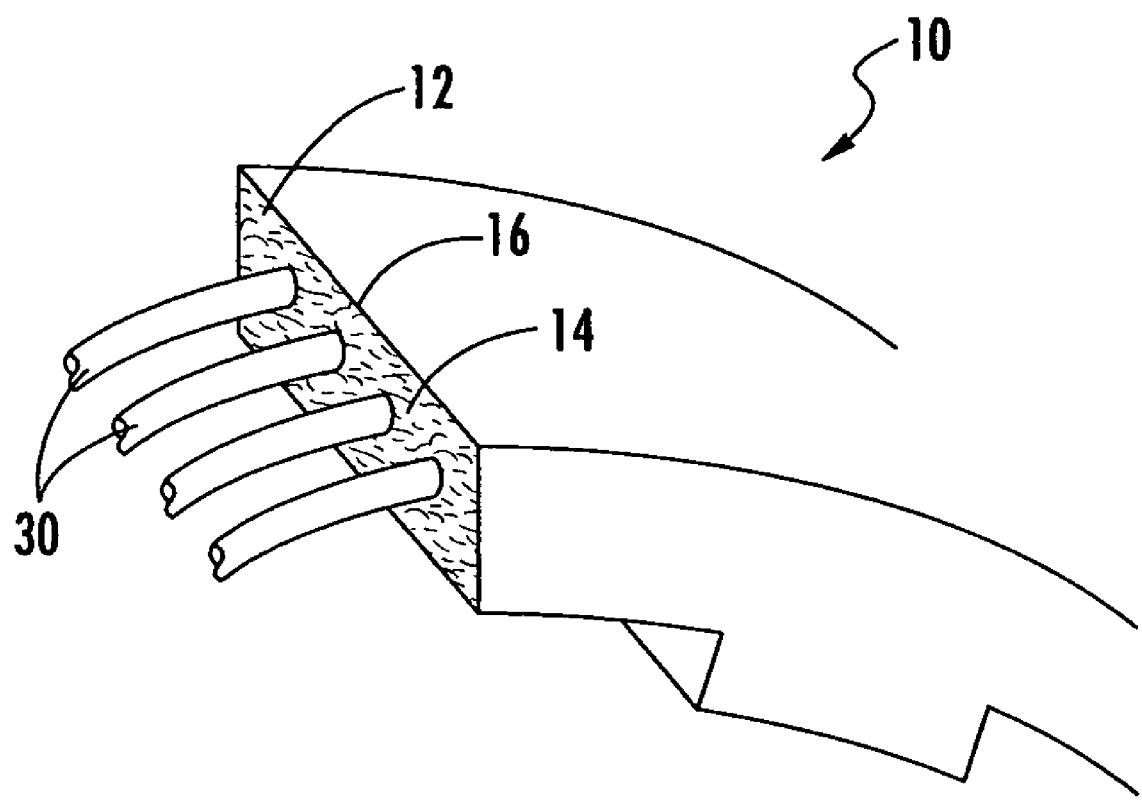
FIG. 5 is a cross-sectional view thereof illustration the addition of reinforcing fibers.

Turning to FIG. 5, the belt 10 may also include a reinforcing tensile layer or a plurality of tensile members 30, which are well known to the art, such as the longitudinally extending and spaced tensile cords 30. These tensile members 30 may consist of one or more strands of a conventional stress-resistant material such as polyamide cord, aramid fibers, fiberglass, polyester cord or wire filaments. The tensile members 30 may be prestressed or impregnated with a suitable material if desired. These reinforcing members 30 are placed into the mold cavity prior to introducing the polymer composition 12. In this fashion, the tensile members 30 are insert molded into the profile of the belt 10 to provide additional strength and longitudinal dimensional stability.

It can therefore be seen that the present invention is greatly advantageous over the prior art because it is formed in its final shape thus eliminating a trimming or shaping that is now required with rubber belts 10. Further, the belt 10 is not laminated or laid up thus elimination several assembly steps as compared to the belts of the prior art. In addition, the present invention is lighter than prior art belts making it particularly desirable for use. Finally, it is a completely self-contained passive thermal dissipating solution providing for cooling of the belt 10 without requiring additional fans or cooling means thus reducing the number of parts and making assembly and maintenance less labor intensive. Most importantly, as a result of the reduced heat that must be continuously retained in the surface 18 of the belt 10, the belt 10 of the present invention resists localized break down from heat stresses and wears much longer than prior art belts. For these reasons, the present invention is believed to represent a significant advancement in the art, which has substantial commercial merit.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed:

1. A method of manufacturing a thermally conductive drive belt, comprising:
    providing a base flexible thermoplastic polymer matrix of, by volume, between 30 and 60 percent;
    providing a first thermally conductive filler having an aspect ratio of at least 10:1 of, by volume, between 30 and 40 percent;
    providing a second thermally conductive filler having an aspect ratio of less than 5:1 of, by volume, between 10 and 20 percent;
    mixing the first thermally conductive filler, the second thermally conductive filler and the base polymer matrix to form a moldable composition;
    injecting the moldable composition into a mold cavity to form a continuous loop thermally conductive drive belt; and
    uniformly loading the first thermally conductive filler and the second thermally conductive filler throughout the drive belt.

2. The method of manufacturing a thermally conductive drive belt of claim 1, wherein the base polymer matrix is a flexible thermoplastic material selected from the group consisting of: flexible nylon 6, flexible nylon 6,6, flexible polyolefin and flexible polyester.

3. The method of manufacturing a thermally conductive drive belt of claim 1, wherein the first thermally conductive filler material and the second thermally conductive filler material are selected from the group consisting of: boron nitride, pitch based carbon fiber, metal flakes, alumina and crushed glass.

4. The method of manufacturing a thermally conductive drive belt of claim 3, wherein the first thermally conductive filler material is pitch based carbon fiber.

5. The method of manufacturing a thermally conductive drive belt of claim 3, wherein the second thermally conductive filler material is boron nitride.

6. The method of manufacturing a thermally conductive drive belt of claim 1, further comprising the step of:
    placing an array of continuous structural reinforcing members into a mold cavity, prior to the step of injecting the moldable composition.

* * * * *